May 25, 1926.

V. E. LANE

SHAFT COUPLING

Filed August 23, 1924

Inventor
Victor E. Lane,

Attorneys

Patented May 25, 1926.

1,586,250

UNITED STATES PATENT OFFICE.

VICTOR E. LANE, OF DETROIT, MICHIGAN, ASSIGNOR OF ONE-HALF TO FRANK L. SCHWARZ, JR., OF DETROIT, MICHIGAN.

SHAFT COUPLING.

Application filed August 23, 1924. Serial No. 733,752.

This invention has reference to flexible couplings its objects being to provide a very simply constructed and operable arrangement which admits of ready assembling, disassembling and replacement of parts from time to time, and the removal and replacement of driving pins therein without necessitating the displacement of the coupling members with respect to one another.

A still further object is to provide a coupling of the type referred to, coupling pins each of which is secured to one of the coupling members only and freely enters the other of said coupling members whereby said members are separable without the dismounting of any of the said pins; and still further objects subsidiary to or resulting from the aforesaid objects, or from the construction or operation of the invention as it may be carried into effect, will become apparent as the said invention is hereinafter further disclosed.

In carrying the said invention into effect I may provide a flexible coupling wherein each coupling member comprises a disk having more or less flexible pins mounted thereon, and extending from the face thereof into coincident orifices in the opposed disk without being secured in or to such opposed disk other than against lateral movement with respect to the receiving disk so that said pins are coupled to effect the rotating of one disk by the other whilst permitting the separation of the two disks axially, the spacing of the two disks being preserved by the shafts upon which they are mounted. All of which is more particularly described and ascertained hereinafter by way of example, having reference to the accompanying drawing, wherein Figure 1 is a transverse section of the coupling taken on the line 1×—1× Figure 2;

Similar characters of reference indicate similar parts in the several figures of the drawing.

Figure 1:
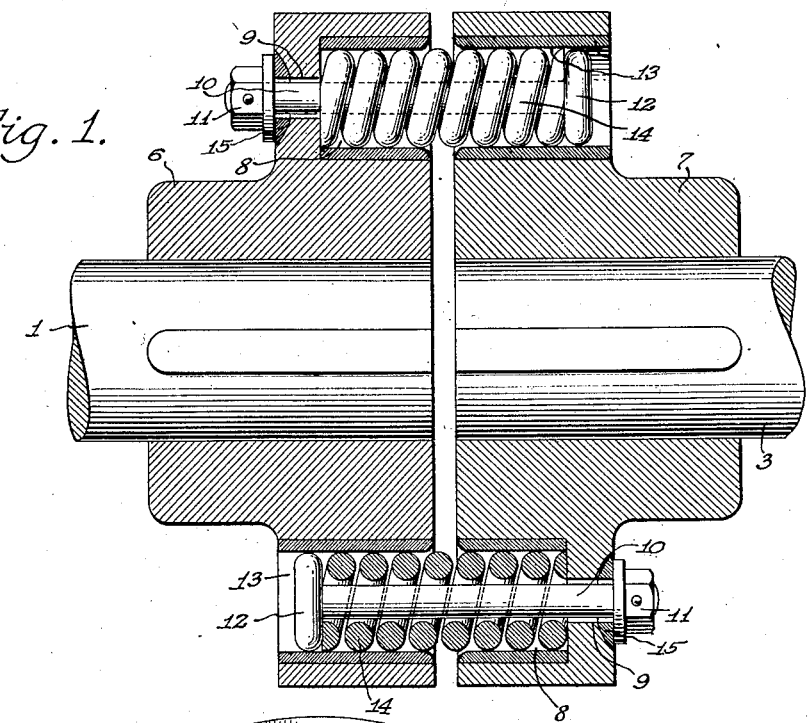
Figure 2:
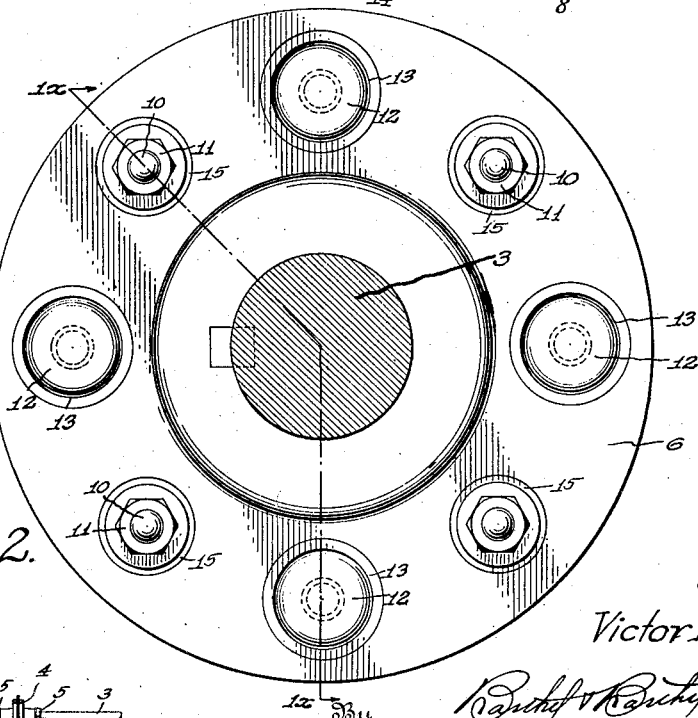
Figure 2 is an end elevation of the said coupling.
Figure 3:
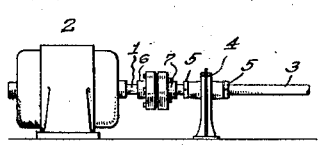
Figure 3 illustrates in elevation the application of the device to the transmission shaft of an electric motor.

1 is the shaft or spindle of a motor 2 and 3 is a further shaft mounted in the pedestal block 4 and provided with thrust collars 5, the shafts being spaced in fixed endwise relation one to the other.

The flexible coupling embodying the said invention is shown as comprising members or disks 6 and 7 keyed to the shafts 1 and 3 respectively the said disks being provided with sockets 8 in their faces and the bases of said sockets drilled to form bolt holes 9 through which pass bolts 10 secured against withdrawal therefrom by nuts 11. The said bolts are of smaller diameter than the holes through which they pass whereby they are capable of some angular movement.

The outer ends of the said bolts are expanded to form heads 12 which are rounded on their peripheries and extend into chambers or orifices 13 in the disks opposed thereto, the said heads 12 also being capable of angular movement in the said chambers 13, which angular movement is, however, limited to a considerable extent by coiled springs 14 mounted upon the said bolts and entering both the sockets 8 and the chambers 13 as shown. The said bolts and their springs form flexible pins and actuate as resilient driving members between the two coupling members, in the example shown the driving member 7 being effected by the member 6 through the pins comprising the bolts and springs 10 and 14.

An examination of Figure 1 of the drawing clearly reveals that the said pins are only secured at one end, the other ends freely entering the opposed coupling so that in the event of slight peripheral differences in the axes of the shafts 1 and 3 the movement of the pins in the chambers may take place as the coupling is rotated thereby relieving the strain which would otherwise occur between the two shafts.

Furthermore, it will be seen that in disassembling the shaft 3 from the shaft 1 it may be withdrawn from its position relative to the shaft 1 (after the release of the thrust collars 5 in this example) without necessitating the prior disconnecting or removal of any of the parts of the coupling, as the two members 6 and 7 are freely separable in an axial direction.

15 are washers on the bolts 10, said washers having convex faces recessed with the rear faces of the disks 6 and 7 in order to facilitate the rocking of the said bolts in their sockets during operation.

This invention may be developed within the scope of the following claims without departing from the essential features of the said invention and it is desired that the specification and drawing be read as being merely illustrative and not in a limiting sense, except as necessitated by the prior art.

What I claim is:

1. In a device of the class described, connecting members comprising a pair of disks adapted to be secured to the contiguous ends of shafts, said disks being provided with axially extending orifices, axially and angularly movable pins secured to and extending from one of said disks into the orifices of the other disk, and further angularly movable pins secured to the other disk and extending into the orifices of the first mentioned disk, all of said pins being capable of freely slidable movement in the disks into which they extend, whereby the separation of the ends of said shafts will result in the free withdrawal of the outer ends of the pins from the orifices of the disks into which they extend, and springs resisting the said axial and angular movement of said pins in and on the disks to which they are secured.

2. In a device of the class described, connecting members comprising a pair of disks adapted to be secured to the contiguous ends of shafts, said disks being provided with axially extending orifices, flexibly mounted pins secured to and extending from one of said disks into the orifices of the other disk, and further flexibly mounted pins secured to said other disk extending into the orifices of said first mentioned disk, said pins being provided with expanded outer ends freely slidable in the said orifices into which they extend and capable of being withdrawn outwardly therefrom upon the separation of said disks, and coiled compression springs surrounding said springs tending to press said ends outwardly from the face of their supporting disks.

3. In a device of the class described, opposed coupling disks each provided with alternately arranged sockets and orifices and with bolt holes in the base of the sockets, members in the form of bolts having their heads freely movable in and withdrawable from the orifices of the opposed disk and their stems extending through and secured against withdrawal from the said bolt holes, and compression springs on the stems of said bolts between the heads thereof and the base of said sockets.

In testimony whereof I affix my signature.

VICTOR E. LANE.